United States Patent
Doherty et al.

(10) Patent No.: US 8,189,479 B1
(45) Date of Patent: May 29, 2012

(54) CONGESTION CONTROL FOR WIRELESS SENSOR NETWORKS

(75) Inventors: Lance Robert Doherty, Berkeley, CA (US); Jonathan Simon, Castro Valley, CA (US); Zhenqiang Ye, Mountain House, CA (US)

(73) Assignee: Dust Networks, Inc., Hayward, CA (US)

( * ) Notice: Subject to any disclaimer, the term of this patent is extended or adjusted under 35 U.S.C. 154(b) by 18 days.

(21) Appl. No.: 12/387,454

(22) Filed: Apr. 30, 2009

Related U.S. Application Data

(60) Provisional application No. 61/130,523, filed on May 30, 2008.

(51) Int. Cl.
*H04J 1/16* (2006.01)

(52) U.S. Cl. .......................... 370/236; 370/232; 370/235

(58) Field of Classification Search .................. 370/232, 370/230, 235, 236, 237
See application file for complete search history.

(56) References Cited

U.S. PATENT DOCUMENTS

| | | | |
|---|---|---|---|
| 6,400,686 B1* | 6/2002 | Ghanwani et al. | 370/232 |
| 7,668,201 B2* | 2/2010 | Sharony et al. | 370/468 |
| 2003/0069683 A1* | 4/2003 | Lapidot et al. | 701/117 |
| 2004/0052212 A1* | 3/2004 | Baillargeon | 370/235 |
| 2007/0127378 A1* | 6/2007 | Yang et al. | 370/235 |
| 2007/0206547 A1* | 9/2007 | Gong et al. | 370/338 |
| 2008/0212504 A1* | 9/2008 | Venkataraman et al. | 370/310 |
| 2008/0279204 A1* | 11/2008 | Pratt et al. | 370/406 |
| 2008/0298251 A1* | 12/2008 | Khuu et al. | 370/238 |
| 2009/0059842 A1* | 3/2009 | Maltseff et al. | 370/328 |
| 2009/0232001 A1* | 9/2009 | Gong et al. | 370/236 |

OTHER PUBLICATIONS

Hull et al., Mitigating Congestion in a Wireless Sensor Network, Vov. 3 2004, ACM pp. 1-14.*

* cited by examiner

*Primary Examiner* — Ricky Ngo
*Assistant Examiner* — Rasheed Gidado
(74) *Attorney, Agent, or Firm* — McDermott Will & Emery LLP

(57) ABSTRACT

A system for congestion control for a wireless sensor network comprises a processor and a memory. The processor is configured to determine a level of congestion at one or more nodes and indicate an adjustment to network traffic in response to the level of congestion. The adjustment to the network traffic reduces the level of congestion at the one or more nodes. The memory is coupled to the processor and configured to provide instructions to the processor.

42 Claims, 14 Drawing Sheets

CONGESTION CONTROL FOR WIRELESS SENSOR NETWORKS

CROSS REFERENCE TO OTHER APPLICATIONS

This application claims priority to U.S. Provisional Patent Application No. 61/130,523 entitled CONGENSTION CONTROL FOR TDMA BASED WIRELESS SENSOR NETWORKS filed May 30, 2008, which is incorporated herein by reference for all purposes.

BACKGROUND OF THE INVENTION

Congestion control is an essential component in communication networks. Wireless Sensor Networks (WSNs) have particular constraints (e.g., allowed power limits, time-varying wireless links, etc.) that render congestion potentially catastrophic to data delivery. Furthermore, WSNs have limited resources (e.g., computation power, bandwidth) that make it difficult for WSNs to eliminate congestion once it occurs. The congestion may force the WSN into a vulnerable state wherein control packets do not arrive in a timely manner, thereby pushing the network to collapse. In a Time Division Multiple Access (TDMA)-based WSN, nodes are assigned periodic and fixed timeslots in which they can send and receive packets. The number and frequency of these repeating timeslots results in a fixed amount of bandwidth being assigned to each node. A network management application ("manager") is responsible for the global coordination of network operation, though it is not, in general, aware of each packet transmission nor the multi-hop route followed by each packet.

One solution for reducing congestion is an over assignment of links to and from all nodes in the network which increases bandwidth based on the maximum known potential traffic flowing through the node. For example, if all descendants of a node generated a maximum of 10 packets per second, the node is configured to safely transmit 10 packets per second excluding any retry requirements due to wireless path quality. However, this consumes more resources (e.g., power) for nodes in the network than is necessary.

BRIEF DESCRIPTION OF THE DRAWINGS

Various embodiments of the invention are disclosed in the following detailed description and the accompanying drawings.

DETAILED DESCRIPTION

Figure 1:
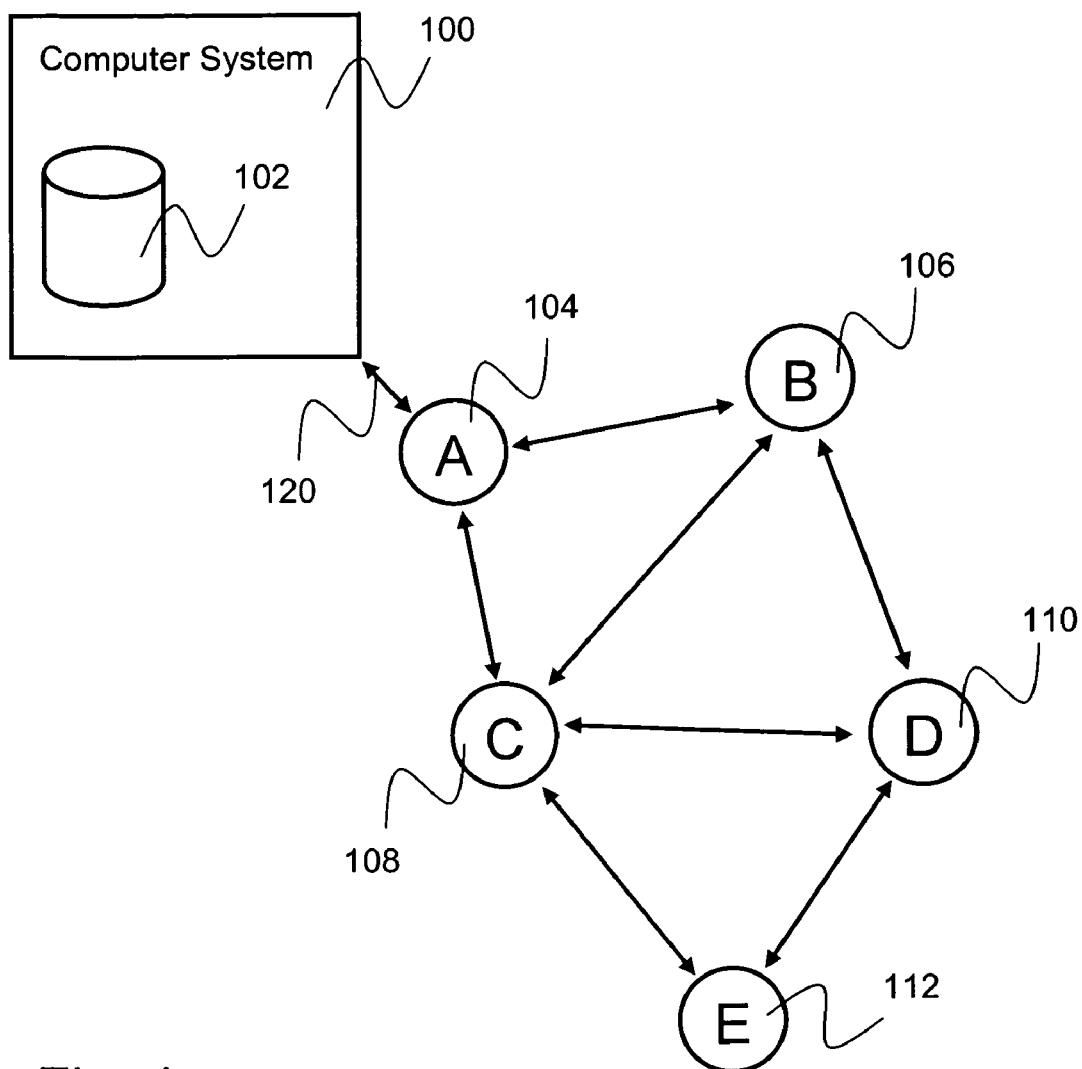
FIG. 1 is a block diagram illustrating an embodiment of a mesh network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Congestion control for a wireless sensor network is disclosed. A system for congestion control for a wireless sensor network comprises a processor and a memory. The processor is configured to determine a level of congestion at one or more nodes and to indicate an adjustment to network traffic in response to the level of congestion, wherein the adjustment to the network traffic reduces the level of congestion at the one or more nodes.

In some embodiments, a level of congestion is determined at a packet source node by tracking each of the multi-hop routes taken by all packets generated at this source, adding and subtracting traffic in a queue for each destination node knowing traffic contributed to each node by the source node and knowing a likely or a measured ability of each node to reduce its queue size. In some embodiments, the queue level is tracked by receiving information from a node indicating queue levels (e.g., a congestion level), reception rate, and/or a transmission rate.

In some embodiments, the congestion level in the network or at a node is reduced by adding more transmission capacity at nodes where congestion is occurring (e.g., a high queue level, an increasing queue level, etc.). In various embodiments, transmission capacity is added to a given node in the network by adding links exiting from the given node in an existing operating graph/superframe at the given node, transmission capacity is added to a given node in the network by adding links in a new operating graph/superframe at the given node, or any appropriate manner of adding transmission capacity. In some embodiments, packet transmission is reduced and/or eliminated to address a given nodes congestion.

In various embodiments, a manager and/or an individual node evaluates a given node's congestion and decides to reduce/eliminate its own and/or other's (e.g., a given node's neighbor node's) packet generation. In some embodiments, traffic is reduced at a given node by reducing services (e.g., services comprise an indefinitely long series of packets generated at a regular rate of one per second, a large one-time batch of packets (e.g., a file for upload), an alarm capacity to deliver an occasional packet in less than one second, or any other appropriate service).

In some embodiments, congestion is reduced by addressing a cause of a failed reception of a transmission. In some embodiments, the cause addressed is the overall power transmitted by other nearby nodes (e.g., node power is reduced as a good neighbor policy).

In a WSN, data can flow from manager to nodes, from nodes to manager, or directly among nodes, in discrete packet form. These data flows are grouped according to source and destination. The flow routing is controlled by the manager by assigning a "graph" to each flow. Not all devices are in communication range of each other so, in general, packets need to traverse several intermediate nodes between source and destination while following the vertices of a graph. Each vertex of a graph is a node, and each edge of a graph is called a "path". Each successful transmission, known as a hop, brings the packet closer to its destination.

FIG. 1 is a block diagram illustrating an embodiment of a mesh network. In the example shown, the mesh network comprises node 104, node 106, node 108, node 110, node 112, and computer system 100. Computer system 100 communicates with access point node 104 via connection 120. In various embodiments, connection 120 is a wired connection, a wireless connection, a local area network, a wide area network, the Internet, or any other appropriate network. In some embodiments, access point node 104 is one of a plurality of access point nodes. In some embodiments, computer system 100 is capable of processing data sent to it through the mesh network and is known as a manager. Computer system 100 includes a processor for processing instructions and storage 102.

In the example shown, node 104 is connected to node 106 and node 108. Node 106 is connected to node 104, node 108, and node 110. Node 108 is connected to node 104, node 106, node 110, and node 112. Node 110 is connected to node 106, node 108, and node 112. Node 112 is connected to node 108 and node 110. In some embodiments, node 104, node 106, node 108, node 110, node 112 communicate using radio frequencies that are in the 900-930 MHz or 2.45 GHz industrial, scientific, and medical (ISM) radio band. In some embodiments, the mesh network is compatible with IEEE standard 802.15.4. The IEEE 802.15.4 standard relates to low rate wireless personal area networks. In some embodiments, the ability of nodes to link is determined by their physical distance from one another.

Figure 2:
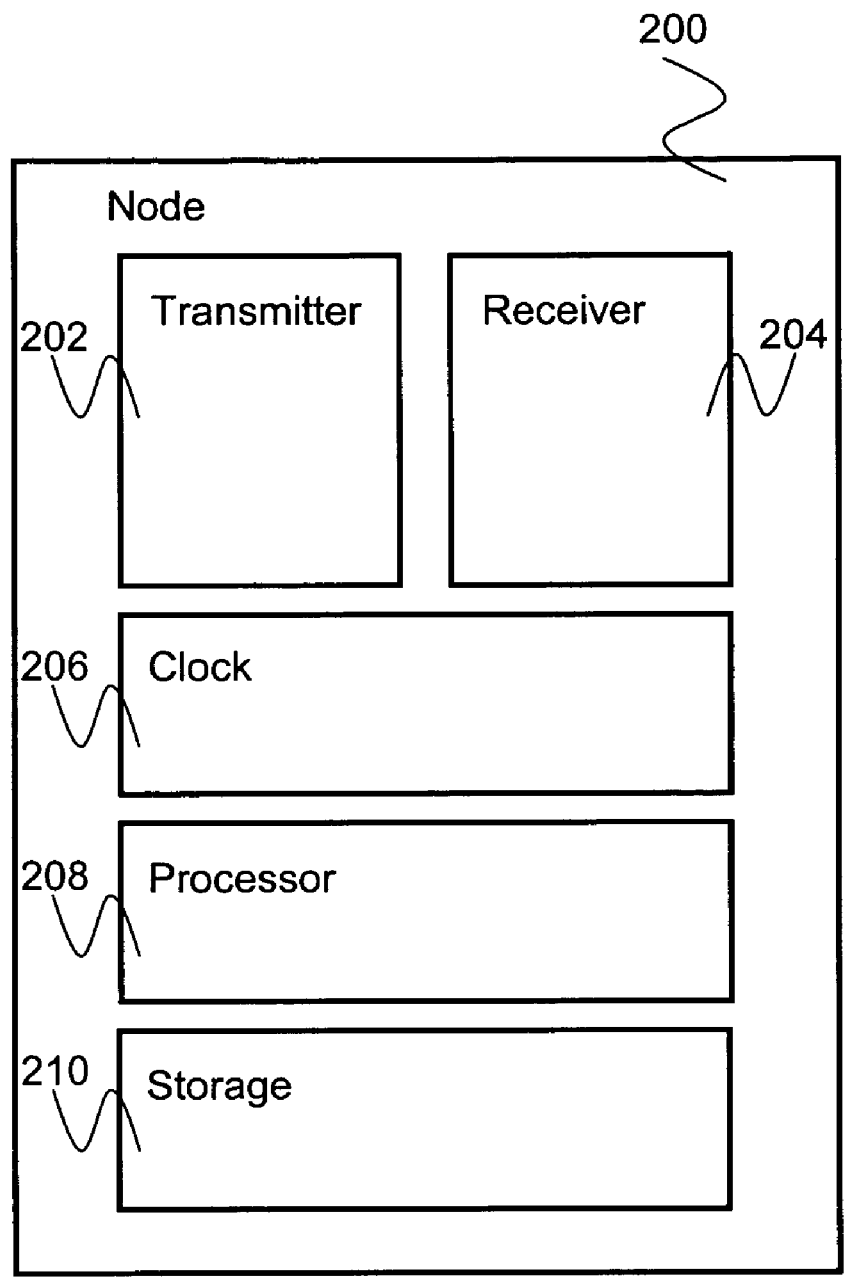
FIG. 2 is a block diagram illustrating an embodiment of a node.

FIG. 2 is a block diagram illustrating an embodiment of a node. In some embodiments, node 200 of FIG. 2 is part of a mesh network (e.g., node 104, node 106, node 108, node 110, and/or node 112 of the mesh network of FIG. 1). In the example shown, node 200 comprises transmitter 202, receiver 204, clock 206, processor 208, and storage 210. Transmitter 202 and receiver 204 enable node 200 to communicate with other nodes and/or with other systems that include transmitters and/or receivers. In various embodiments, transmitter 202 and/or receiver 204 communicate using frequency modulated signals, phase modulated signals, amplitude modulated signals, time division multiplexing signals, code division multiplexing signals, signals compliant with the Institute of Electrical and Electronics Engineers (IEEE) 802.11 standard, signals compliant with the Institute of Electrical and Electronics Engineers (IEEE) 802.15.4 standard, signals according to the Bluetooth protocol, signals according to the ultra wide bandwidth (UWB) approach, or signals encoded using any other appropriate scheme. In various embodiments, transmitter 202 and/or receiver 204 communicate in the medium frequency band, the high frequency band, the very high frequency band, the ultra high frequency band, or any other appropriate frequency band. In some embodiments, transmitter 202 and receiver 204 communicate using the industrial, scientific, and medical (ISM) bands (e.g., 902-928 MHz, 2.400-2.500 GHz, 5.725-5.875 GHz, etc.). In some embodiments, transmitter 202 and receiver 204 can switch between a low bandwidth/low power consumption mode and a high bandwidth/high power consumption mode, to enable low power use during normal operation but allow for high bandwidth transmission when necessary. In some embodiments, node 200 includes a battery and is designed to require infrequent battery replacement (e.g., a low power node that has a battery change once a month, once a few months, once a year, once every few years, etc. depending on the application). In some embodiments, node 200 includes systems designed to gather and store energy from the environment (e.g., light energy from the sun or other light energy sources, mechanical energy from vibration of the node, or any other appropriate environmental energy source).

Figure 3:
FIG. 3 is a diagram illustrating an embodiment of a communications superframe for a time synchronized mesh network.

FIG. 3 is a diagram illustrating an embodiment of a communications superframe for a time-synchronized mesh network. Each hop in a time-synchronized mesh network requires one or more pair-wise communication transactions between two devices. Time in a time-synchronized mesh network is broken into synchronized units called "timeslots" which are long enough for one such transaction to occur. A global "superframe" schedule coordinates all such communication in the network enabling different multi-hop routes to be taken from source to destination depending on the neighbor assignments. In some embodiments, a superframe comprises a plurality of sets of timeslots, corresponding to multiple links able to be activated at once on separate radio channels. In some embodiments, superframe 300 comprises a communications schedule for the mesh network of FIG. 1. In the example shown, superframe 300 comprises a series of six timeslots and five frequency channel offsets. In some embodiments, a given node only transmits or receives on one channel at a time. In various embodiments, each cell of superframe 300 is filled with one or more communication links or is not filled with one or more communication links.

The set of communication links in FIG. 3 describes which node is transmitting and which node is listening on each communication channel in each timeslot. For timeslot 1 and channel offset 5, node C transmits to node B. For timeslot 2 and channel offset 1, node C transmits to node A. For timeslot 2 and channel offset 4, node D transmits to node B. For timeslot 3 and channel offset 1, node E transmits to node C. For timeslot 3 and channel offset 2, node B transmits to node A. For timeslot 4, no nodes are transmitting or listening. For timeslot 5 and channel offset 1, node D transmits to node C. For timeslot 6 and channel offset 4, node E transmits to node D. For timeslot 6 and channel offset 5, node B transmits to node A.

Figure 6:
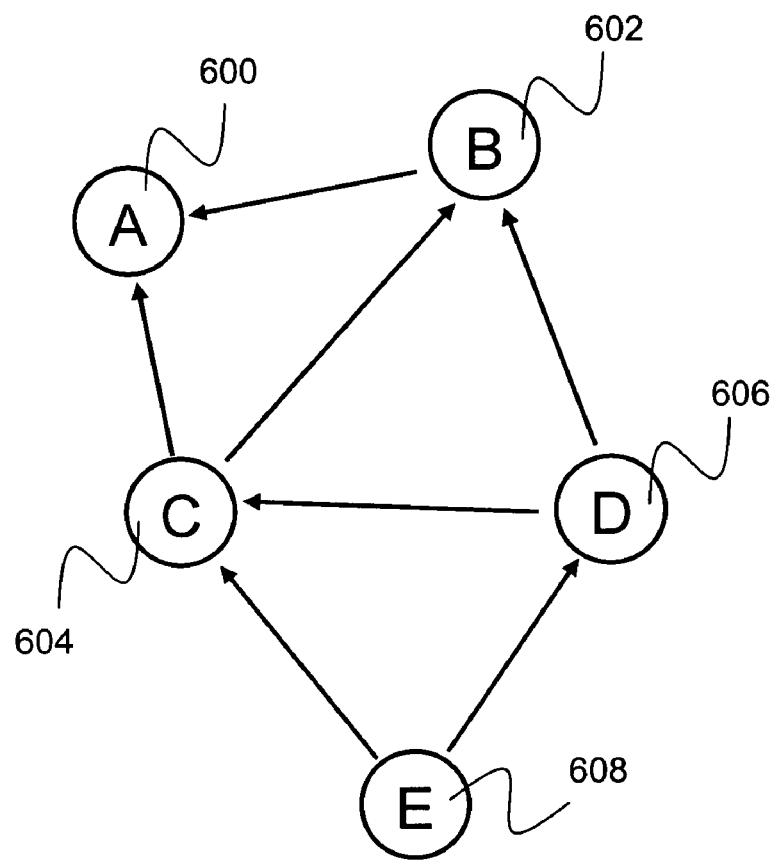
FIG. 6 is a block diagram illustrating an embodiment of a section of a mesh network for determining candidates for service halting.

The collection of paths represented by the links in FIG. 3 forms a graph. The graph formed by these links is represented in FIG. 6. A path exists where there is at least one link. The number of links on a path is directly proportional to the bandwidth along that path. The bandwidth is a measure of the packet rate that can be sent along a path.

In various embodiments, each channel offset in a frame corresponds to a predetermined transmission frequency, to a pseudo randomly permuted transmission frequency, to a transmission frequency changing according to a predetermined schedule, or to a frequency determined in any other appropriate way.

In some embodiments, a timeslot channel combination in a frame is used to broadcast from a transmitting node to any node that can receive the broadcast. In some embodiments, for a timeslot-channel combination designated to transmit from node 'X' to be received by node 'Y' is also used to acknowledge the receipt of a message by transmitting an acknowledgement message from node 'Y' to be received by node 'X'.

A node is congested when packets need to wait for retransmission to the next hop along their route because of other packets in the node's transmission queue. Congestion results when there is insufficient bandwidth allocated for the node to forward any locally or externally generated packet before another packet is inserted into the queue. Wireless link quality varies due to uncontrollable environmental changes so bandwidth sufficient at one time may not be sufficient at a later time. As packet queues build up at a node, the latency required for packets routed through this node increase and the congestion may spread to neighboring nodes. Once latency increases beyond a certain bound, control packets may not be delivered on time and the manager will drop nodes from the network. This impact of congestion on network control is undesirable, as is the overall increase in latency from non-critical packets.

In some embodiments, the network is configured such that nodes periodically report sensor data to the manager while the manager sends control packets to the nodes for setup, configuration, and data polling. Packets travelling in either direction, either from the manager to nodes (downstream), or to the manager from the nodes (upstream), contribute to congestion in the network. The upstream traffic is more predictable, but the manager does not have access to upstream packet generation and hence cannot control the specific multi-hop routes taken by each packet as each node can have a plurality of next-hop neighbors. Congestion is avoided by over-assigning upstream bandwidth as compared to the amount strictly required for the number of packets generated. The downstream traffic is more sporadic, but the manager is able to throttle it to ensure that congestion is avoided and thus avoid the need for over-assignment of bandwidth.

In some embodiments, nodes request a "service" from the manager which provides an upper bound on their local packet generation rate. In various embodiments, a service comprises an indefinitely long series of packets generated at a regular rate of one per second, a large one-time batch of packets (e.g., a file for upload), an alarm capacity to deliver an occasional packet in less than one second, or any other appropriate service. Based on the requested service rate at a node and all other nodes that use this node as an intermediate hop towards their destination, the manager calculates the required amount of bandwidth for this node's traffic. When a minimum packet success rate is known or estimated, this rate is used to determine a bound on the over-assignment of bandwidth required to provide congestion-free services. For example, a node requests a service to send a maximum of 1 packet per second. The manager, estimating the minimum packet success rate from this node at 1/3, assigns a bandwidth which is able to support 3 transmission attempts per second. Three links in a 1-second superframe satisfies this requirement.

In some embodiments, nodes provide time-averaged measurements of the packet success rates on all used paths. This packet success rate, measured in percent, is the path stability. The manager reacts to these reports by adding or deleting bandwidth to balance the risk of congestion versus the additional power required for providing additional bandwidth. For example, node X reports 25% path stability to node Y. This is below the estimated 1/3 that the manager used to allocate links, so the manager allocates additional links from node X to node Y and also to alternate destination node Z. As another example, node X consistently reports 90% path stability to node Y. The manager uses this information as an indication to remove some of the 12 links assigned on the X-Y path. The remaining links are judged to be sufficient to carry the traffic from node X without congestion.

In some embodiments, failed communication links between nodes result in the network no longer having sufficient bandwidth to provide congestion-free routing of all packets. The manager reacts to these failures by halting previously accepted services at nodes thereby decreasing traffic in the network. Decreased packet generation results in less congestion. For example, to alleviate congestion at node X estimated to exceed the capacity of node X by 2 packet/s, the manager halts a 1 packet/s service from node X and a 2 packet/s service from node Y which routes some of its traffic through node X.

In some embodiments, downstream packets have different classes of destination. Unicast packets are destined for one particular node. Multicast packets are destined for more than one node but not all nodes in the network. Broadcast packets are destined for all nodes in the network. The manager consults the downstream bandwidth allocation in addition to the recent packet sending history to determine whether a new packet can be sent downstream into the network without potentially causing congestion.

In some embodiments, nodes transmitting on high stability paths reduce their transmit power. Lower transmit power leads to less interference on other nodes which may simultaneously be receiving messages in the same frequency band. This can increase the path stability of other paths in the same environment and reduce congestion in the network comprising these paths. In some embodiments, reducing transmit power allows frequency reuse of channels so that multiple nodes within a network or nodes in a network and nodes in an adjacent network are scheduled to transmit at the same time on the same channel without causing interference.

In some embodiments, each source-destination pair is characterized by a graph number which routes the packet through one or more hops.

In some embodiments, the fraction of the total output bandwidth from a node to each next potential hop in a graph is used as an estimate of the fraction of traffic that will be routed to this next neighbor. The bandwidth requirement at a node is the sum of the local packet generation rate of the node and the fractional rate of all descendants estimated to pass through the node. The over-assigning of bandwidth at the node is either done by scaling the bandwidth requirement by a fixed value for the entire network or by a specific value estimated or measured for each path.

In some embodiments, a node requests a service from the manager in terms of packets per second. A service is only allowed by the manager if there is enough bandwidth at all nodes between the source and the destination to support the estimated traffic without congestion. The manager adds in more bandwidth following a service request prior to allowing a node to activate the service. If the bandwidth cannot be added as required throughout the graph, the service request is rejected. By ensuring that there is always sufficient bandwidth to support all active services in the network, the manager lowers the risk of congestion. In some embodiments, bandwidth in a time division multiple access (TDMA) network is quantified in terms of links per second (link/s). Without any packet errors, each link per second of bandwidth can support the flow of one packet per second.

Figure 4:
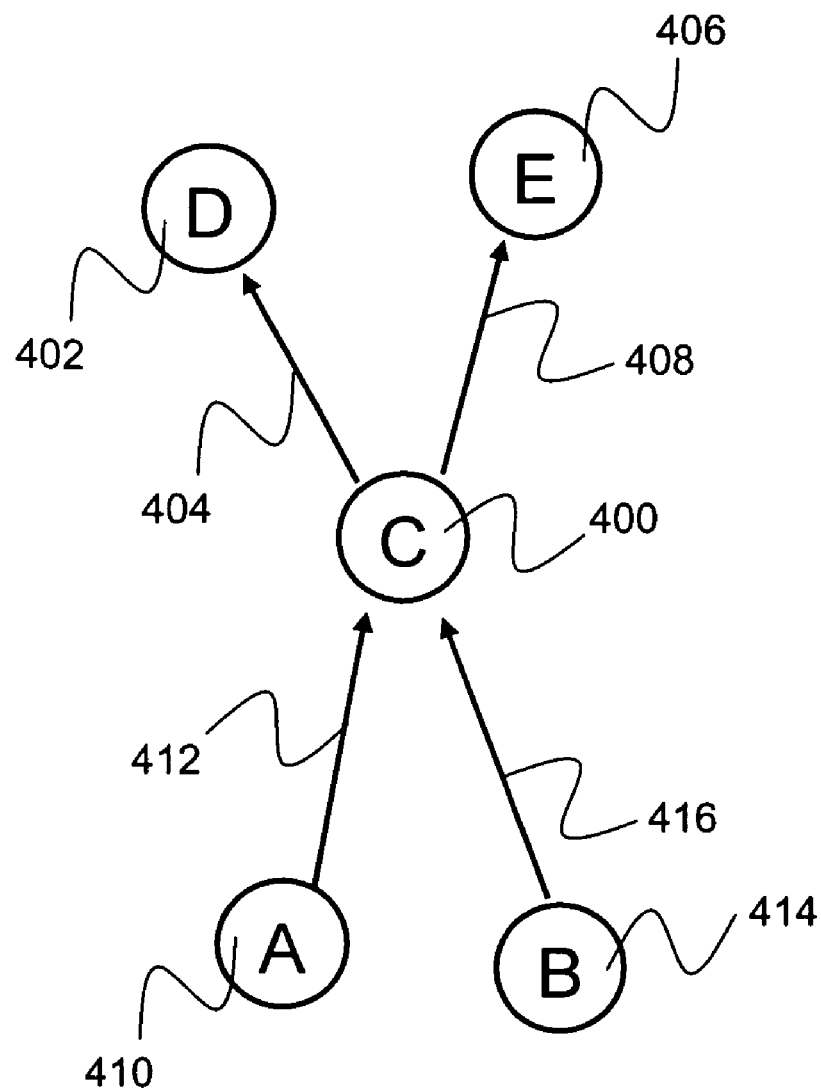
FIG. 4 is a block diagram illustrating an embodiment of a section of a mesh network for calculating bandwidth requirements.

FIG. 4 is a block diagram illustrating an embodiment of a section of a mesh network for calculating bandwidth requirements. In the example shown, a manager calculates the anticipated maximum bandwidth requirement at node 400 by summing up the contribution from its children and the local services. The contributions from the children, nodes 410 and 414, depend on the fraction of packets per second on paths 412 and 416. The packets per second at node 400 are then distributed to nodes 402 and 406 based on the relative numbers of links per second on paths 404 and 408. For example, path 412 carries 1 packet per second, path 416 carries 2 packets per second and node 400 generates 1 packet per second. Node 400 has an output rate of 1+2+1=4 packets per second. If path 404 has 1 link in the superframe of the graph while path 408 has 3 links, 1 packet per second of the output from node 400 is assigned to the path 404 to node 402 and 3 packets per second are assigned to the path 408 to node 406.

Figure 5:
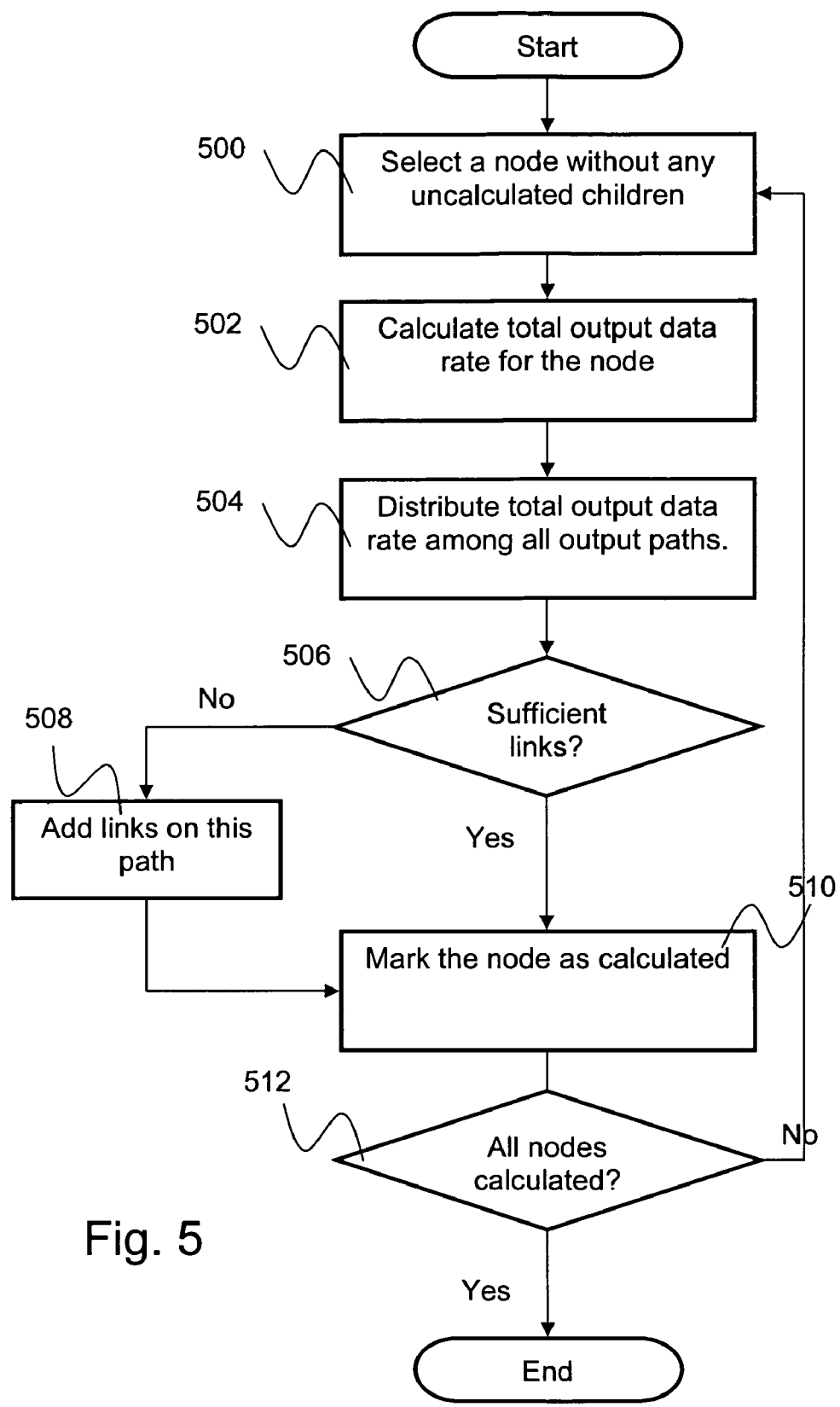
FIG. 5 is a flow diagram illustrating the embodiment of a process for calculating bandwidth requirements.

FIG. 5 is a flow diagram illustrating the embodiment of a process for calculating bandwidth requirements. In the example shown, this process provides an iterative way to calculate the bandwidth requirements for all nodes along a graph. In 500, a node is selected without any uncalculated children. For example, the manager starts with a node whose children have all been calculated. In some embodiments, the manager starts with a node without any children. In 502, a total output data rate for the node is calculated. For example, the manager sums up the output requirement for the node, e.g., node 400 in the previous discussion. In 504, the total output data rate is distributed among all output paths. For example, the manager splits up this output requirement among parents of the node, e.g. nodes 402 and 406 in FIG. 4. In 506, it is determined whether there are sufficient links. For example, the manager checks if the number of output links are sufficient to meet the output bandwidth at the node. In the event that it is determined that there are not sufficient links, in 508 links are added on the path, and control is passed to 510. In the event that it is determined that there are sufficient links, in 510 the node is marked as calculated. In 512, it is determined whether all nodes have been calculated. In the event that it has been determined that all nodes have not been calculated, control passes to 500. In the event that it has been determined that all nodes have been calculated, the process ends.

In some embodiments, the manager uses a fixed scaling factor to calculate the required number of output links per second from the required output packets per second. This quantity should be greater than one to prevent congestion. For example, a scaling factor of 3 links per packet means that a node with 4 packets per second output requires a sum total of 12 links per second along the paths to its parents. In some embodiments, this scaling factor is path-dependent and is a function of the measured path stability. For example, a path with 50% measured stability is assigned twice the number of output links as a path with 100% measured stability for the same congestion risk with the same number of output packets per second.

In some embodiments, nodes periodically generate and send a diagnostic packet to the manager. This packet contains, among other information, the mean and maximum number of packets in the node's packet queue. In some embodiments, the manager uses these values to determine if there is a risk of congestion at the reporting node. This information can also be used in tandem with the process in FIG. 5. For example, a node reporting a maximum queue length of greater than two elements is classified as having been congested at some point in the reporting period. As another example, a node reporting a mean queue length of greater than one element is classified as having been congested for the majority of the reporting period. In either example, the node is classified as being at risk for future congestion based on this past evidence of congestion.

In some embodiments, path and node failure are explicitly reported to the manager by neighboring nodes. The manager thus has the information required to determine the impact of the failure on the capacity of the network to carry all traffic. If the capacity has decreased significantly, the risk of congestion increases. To mitigate this increased risk, the manager halts data reporting from one or more nodes.

FIG. 6 is a block diagram illustrating an embodiment of a section of a mesh network for determining candidates for service halting. In the example shown, a single graph is shown which routes data in the network to node 600 from nodes 602, node 604, node 606 and node 608. The connections in the graph are such that the following hops can be made: packets can go from node 608 to either node 604 or node 606, from node 606 to either node 604 or node 602, from node 604 to either node 602 or node 600, and from node 602 to node 600. Each one of these connections consists of one or more links in a superframe such as the one in FIG. 3. Suppose that the risk of congestion is detected by the manager in node 604. The manager considers halting services at node 604 and all nodes that can route packets through node 604, namely nodes 606 and 608.

Given a graph and one or more congestion points, the manager computes the decrease in traffic required to bring the congestion risk down to an acceptable level (e.g., 70% chance of one node in network being congested at any given time and a 2% risk of two nodes congested). This is done in a process similar to that followed in FIG. 5. The manager orders the congestion points from largest to smallest decreases required and starts with the largest. The manager then halts services routing through this congestion point until congestion risk has been reduced to an acceptable level. For example, the manager assigns links as specified in FIG. 5. Then a node in the network fails which reduces the number of output links at one or more children of the failed node. If no additional links can be added to replace these lost output links, the manager resorts to decreasing service levels so that all nodes have sufficient output links.

Figure 7:
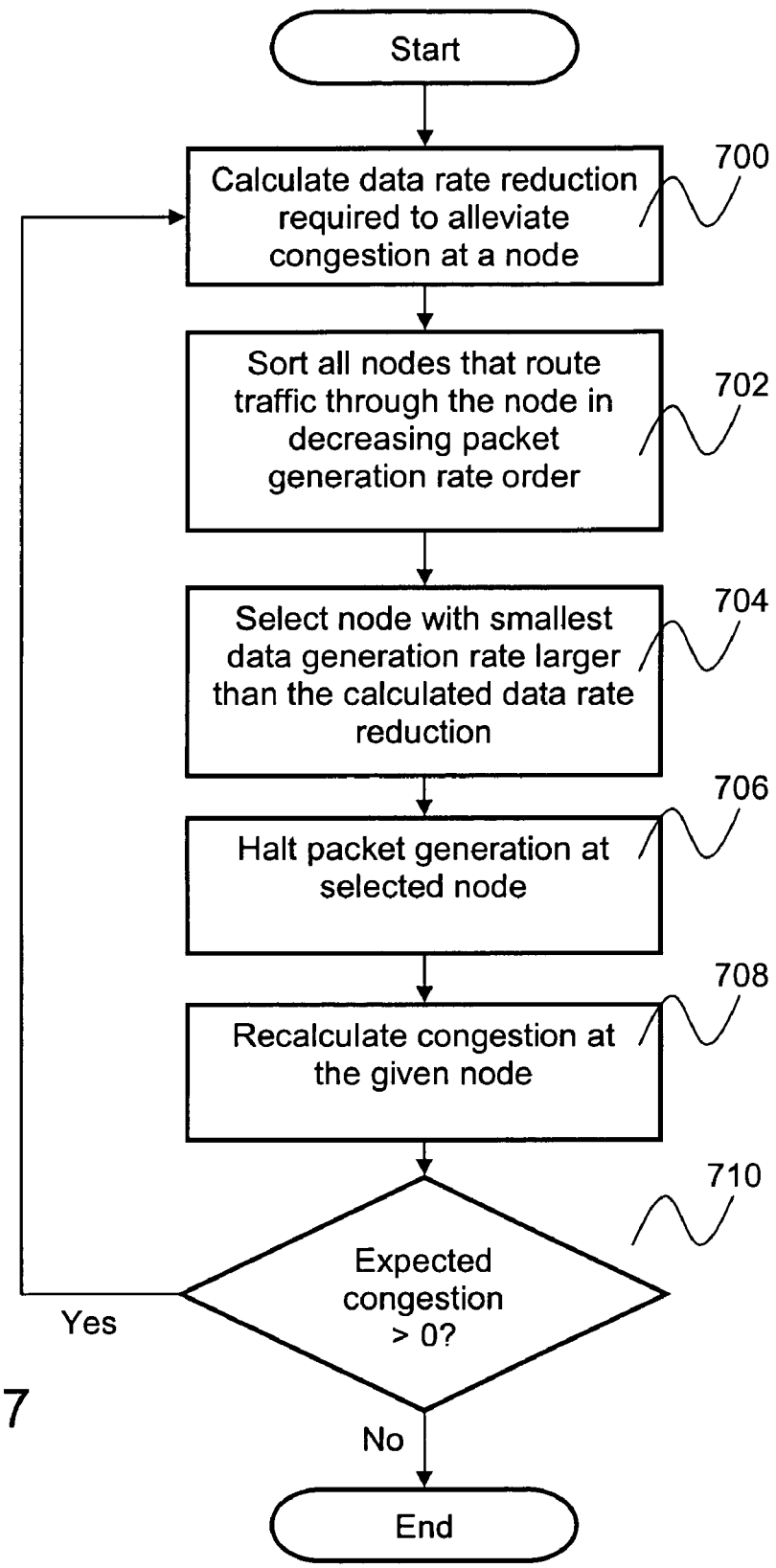
FIG. 7 is a flow diagram illustrating an embodiment of a process for halting services.

FIG. 7 is a flow diagram illustrating an embodiment of a process for halting services. In the example shown, in 700, data rate reduction required to alleviate congestion at a given node is calculated. In 702, all nodes that route traffic through the node are sorted in decreasing packets generating rate (e.g., packets generated per second) order. In 704, a node is selected with the smallest packet generating rate that is larger than the calculated data rate reduction. In 706, the packet generation at the selected node is halted. For example, data reporting at the selected node is halted. In 708, congestion at the node is recalculated. In 710, it is determined whether the congestion is greater than zero. In the event that the congestion is greater than zero, control passes to 700. In the event that the congestion is not greater than zero, the process ends.

In some embodiments, the manager continues the process of FIG. 7 until no congestion points remain. Alleviating congestion at one point in the network will either reduce congestion at other points or keep it the same so the process may terminate in fewer steps than there are originally congestion points. In some embodiments, halting a service results in a packet being transmitted to the node to suspend packet generation. In some embodiments, the halting is temporary (e.g., for a predetermined time); in others it remains until the node requests a new service. In some embodiments, the manager will logically carry out the calculations in FIG. 7 until no congestion remains before sending out all halting packets in a group at the end of the process.

In some embodiments, there is a priority to the services that determines the order which services are halted in what order (e.g., all services of a lower priority on nodes contributing to congestion are halted before any higher priority services).

In some embodiments, the source of a packet determines which nodes will receive the packet and knows how quickly they can retransmit the packet to delete it from their local queues. A "broadcast" packet will be transmitted to all nodes on a particular graph. If the packet source knows the graph, it can determine which nodes will receive the packet. A "source routed" packet will be transmitted along a specified multi-hop route from source to destination. The source route is inserted in the packet header for intermediate nodes to reference to determine the next hop. The packet source inserts the source route and thus knows the list of nodes that will receive the packet. In some embodiments, the only packet source with full knowledge of the network graphs is the manager. In some embodiments, the manager communicates enough information to allow other nodes to accurately determine the span of broadcast packets they source or to calculate a source route for one or more destinations.

In some embodiments, a packet source has storage to maintain a queue of packets waiting to be transmitted. In some embodiments, the packet source reads the entire queue and sorts it in order of packet sending preference. In some embodiments, this packet queue is the same queue that contains packets generated by other nodes each of which have potentially different graphs and destinations. The packet source does not necessarily know the routes of all packets in its queue.

In some embodiments, each packet source aims to limit the number of packets that can build up in the queue at an individual node. By limiting this number, the packet source reduces the risk that any node will be congested. Each packet source maintains a list of "congestion weights" for all member nodes of its broadcast graph and/or source route list. For node k, the packet source associates congestion weight CW(k), which is initialized to zero. Every time the packet source sends a packet that will traverse node k, it increments CW(k) by one. CW(k) is decreased at the packet source at a rate equivalent to how fast the node can send out packets on the relevant graph. For example, if node k can send out 2 packets per second, the decreasing rate of CW(k) is 2 packets per second. CW(k) is not decreased lower than zero. It follows that CW(k) is a whole number.

In some embodiments, each packet source defines a maximum congestion weight (MAX_CW) that limits the number of packets in transit. In some embodiments, MAX_CW is different for each node k. When a packet source considers sending a packet, it checks CW for all nodes that the packet will traverse. If CW(k) of all the traversed nodes is less than MAX_CW(k), the packet can be sent out. Otherwise, at least one node l has CW(l)≧MAX_CW(l), i.e. node l is congested. In the event that a node (e.g., node l) is congested along its anticipated path, the source holds the packet and checks if there is any other packet that traverses a different part of the network can be sent out or not. If any other packet is sent out, CW of all the nodes that the packet will traverse is increased by 1. If a packet is held due to congestion, it will be re-examined later to see if it can be sent out, or not, after the next CW automatic decrease operation.

In some embodiments, packets generated at the packet source have different priority. If a packet with high priority is held due to the fact that its route is congested, the packet source will hold lower priority packets until the higher priority packets have been transmitted. Sending lower priority packets could cause more congestion along the route of the high priority packet and further delay its transmission. In some embodiments, broadcast packets are assigned a higher priority than source routed packets as sending a broadcast packet will otherwise not be done until all source routed packets have been sent. This is due to the broadcast packet increasing the CW of all nodes in the network while any source routed packet increases the CW of only a subset of the nodes.

Figure 8:
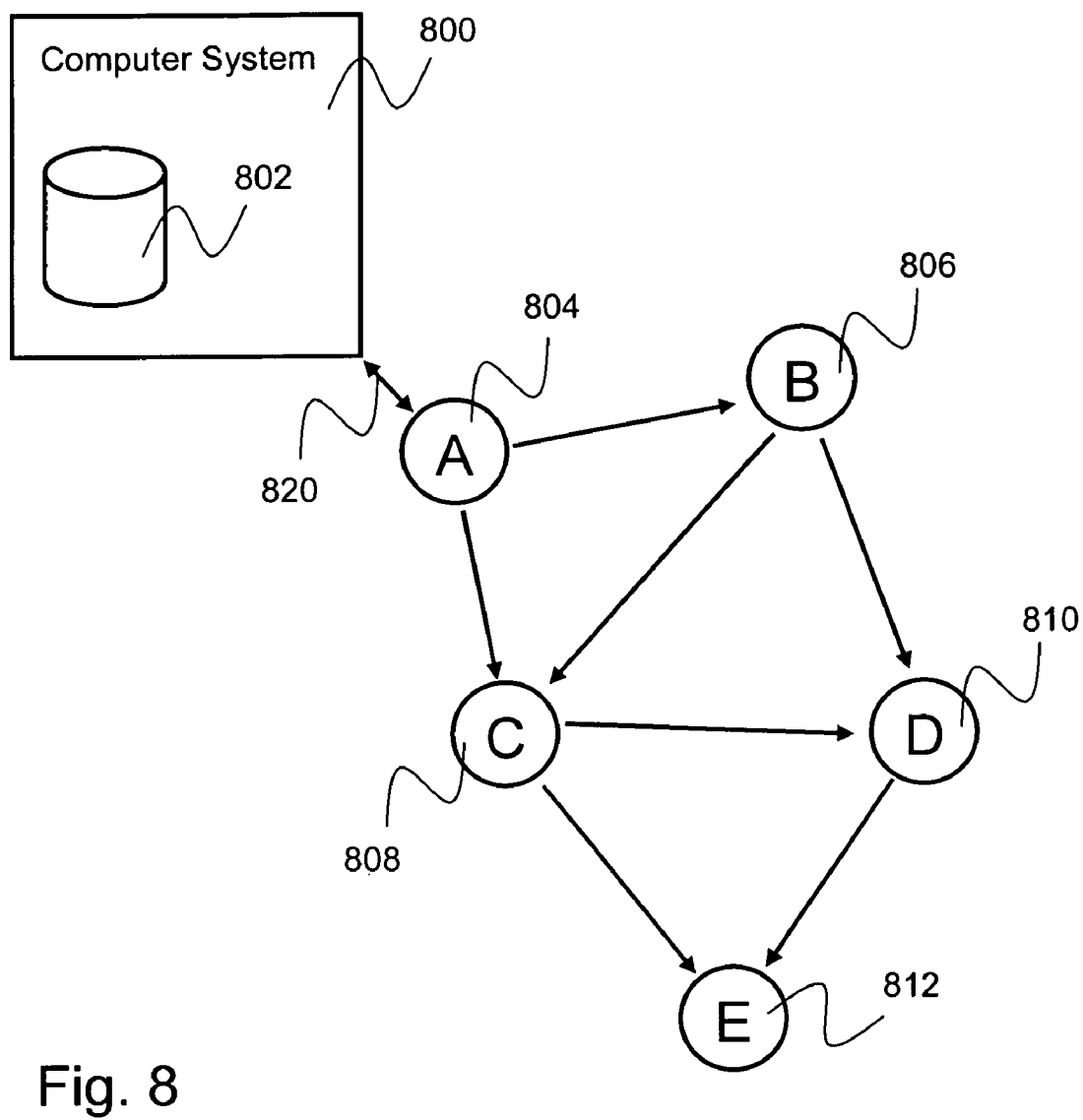
FIG. 8 is a diagram illustrating an embodiment of a packet source and associated graph in a mesh network.

FIG. 8 is a diagram illustrating an embodiment of a packet source and associated graph in a mesh network. In the example shown, computer System 800 is a packet source and maintains a representation of the graph in Storage 802. Computer system 800 includes a processor (not shown) that is configured to execute instructions in a memory (also not shown) or storage 802. The graph includes node 804, node 806, node 808, node 810, node 812 and the following connections: node 804 to node 806 and node 808, node 806 to node 808 and node 810, node 808 to node 810 and node 812, and node 810 to node 812. Each one of these connections comprises one or more links in a superframe similar to the one in FIG. 3. In this example, the packet source, node 800, must verify a stored value indicative of congestion, CW, of all nodes prior to sending a broadcast packet. If no node is congested, the CW of node 804, node 806, node 808, node 810, and node 812 are all incremented by one. If the packet source generates a packet with the source route {node 804, node 806, node 810}, destined for node 810, it checks the CW of nodes 804 and 806 for congestion. If neither is congested, the packet is sent out and the CW of those same two nodes is incremented by one. The packet source decrements the stored value indicative of congestion, CW, at a given time step at a rate associated with a given node's ability to send packets. Note that if actual node k does not decrease its queue size according to its supposed decrease rate, then you will get congestion—the above example is just one method for estimating the rate at which nodes will become congested due to locally-sourced packets. In some embodiments, other ways to detect congestion come into play in parallel (e.g., receiving notification of congestion from nodes, measuring congestion by probing the network, etc.).

In some embodiments, nodes detect the receipt of duplicate broadcast packets. For example, a calculated fingerprint, a calculated checksum, a unique identifier, or other appropriate method is used to detect duplicate packets. Nodes with multiple parents may receive multiple copies of a broadcast packet. In some embodiments, each node only broadcasts a given packet once, regardless how many times it has been received from different sources.

Figure 9:
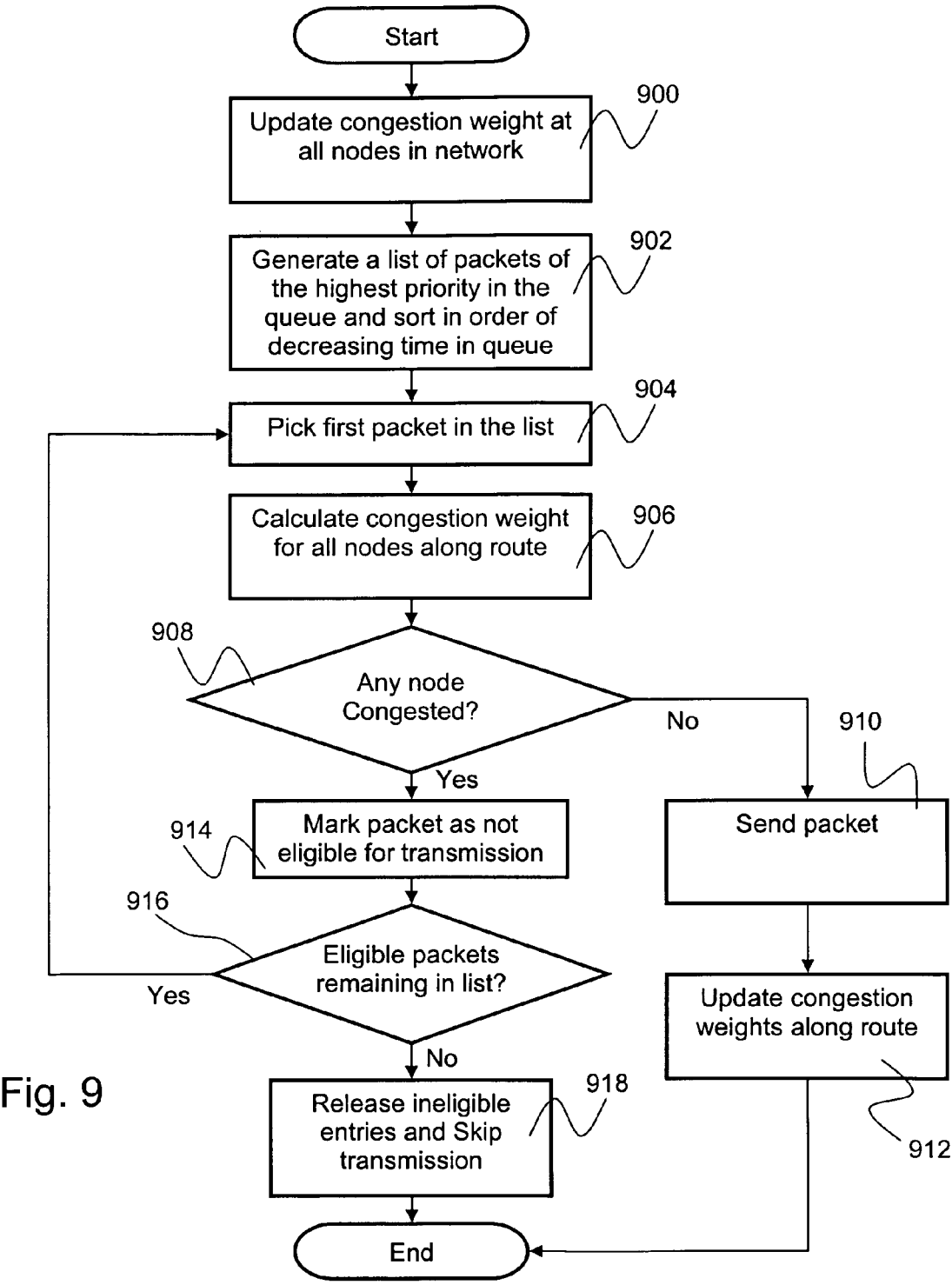
FIG. 9 is a flow diagram illustrating an embodiment of a process for choosing the next packet to be injected on to a graph.

FIG. 9 is a flow diagram illustrating an embodiment of a process for choosing the next packet to be injected on to a graph. In 900, the congestion weights are updated for all nodes in the network. For example, a packet source updates the stored CW for all nodes on its graph by decreasing the stored CW based on the time elapsed since the last packet transmission. A CW value is not allowed to decrease lower than zero. In 902, a list of packets of the highest priority in the queue is generated and sorted in order of decreasing time in the queue. For example, the packets of highest priority in the queue are put into a list, and the list is sorted by time entered. Or for another example, a packet source with packets of 'high' and 'medium' priority will only attempt to send out the 'high' priority packets, and will try in decreasing order of time in the queue. In 904, the first packet in the list is selected. In 906, the congestion weights (e.g., the congestions weights from 900) for all nodes along the route are calculated. In 908, it is determined whether any node is congested. For example, the packet source checks if any of these nodes is congested by determining if a stored value of CW for a given node is greater than or equal to a stored value of MAX_CW for a given node. In the event that no node is congested, in 910 the packet is sent. In 912, congestion weights along route are updated and the process ends. In the event that there is a congested node, in 914 the packet is marked as not eligible to be transmitted. In 916, it is determined if any eligible packets remain in the list. In the event that there are no more packets in the list, in 918 ineligible list entries are released and transmission is skipped; the process terminates. In the event that eligible entries remain, control passes to 904.

In some embodiments, a packet source receives reports on the quality of each path in its graph. This allows it to make a more accurate estimation of the appropriate rate to reduce each CW. For example, a path reported at 50% stability should decrement CW half as often as one reporting 100% stability with the same number of links per second. This may yield fractional values of CW which are rounded up to the nearest integer for the calculations in FIG. 9.

In some embodiments, a node detects that it is congested. For example, the node checks the number of packets awaiting transmission in its output queue. In some embodiments, this node tries to reduce the rate of incoming packets so that the packet output rate is relatively increased and the number of packets in the queue is reduced over time. In some embodiments, the congested node reports on its congestion to all nodes sending it data to forward. In some embodiments, a node congestion report is achieved by including it in the acknowledgement to receipt of a data packet.

Figure 10:
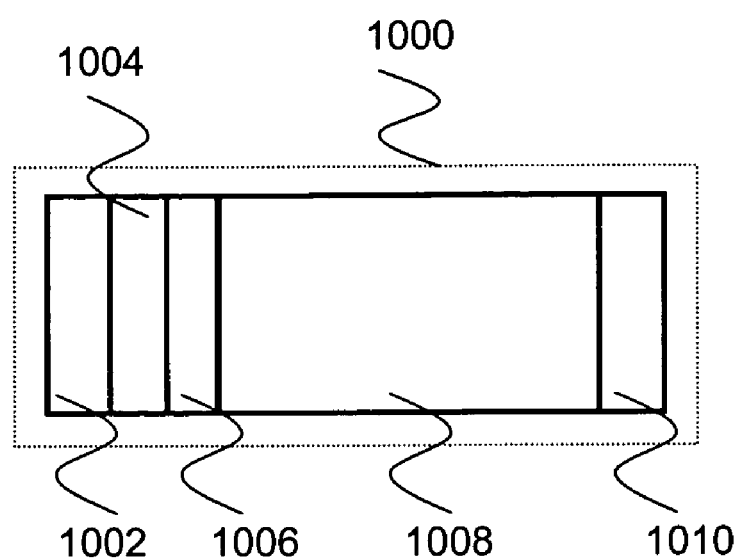
FIG. 10 is a block diagram illustrating an embodiment of the components of a mesh network packet.

FIG. 10 is a block diagram illustrating an embodiment of components of a mesh network packet. In the example shown, packet 1000 includes preamble 1002, start-of-frame delimiter (SFD) 1004, packet length 1006, payload 1008, and checksum 1010. Preamble 1002 comprises a sequence of bits for synchronizing a clock for reading the rest of the packet. SFD 1004 comprises a sequence of bits indicating the start of the information portion of data packet 1000. Packet length 1006 comprises a series of bits from which the length of payload 1008 can be determined. Payload 1008 comprises the data payload of data packet 1000. In various embodiments, payload 1008 comprises one or more of the following: an acknowledgement to a data packet sent during the same timeslot, an indication of congestion (e.g., bits representing the congestion state, CW value, etc.), a data payload, or any other appropriate payload. An acknowledgement is sent from the receiver of the data packet to the sender. Checksum 1010 is calculated using a cyclic redundancy check (CRC) operating on payload 1008, and is used to determine whether payload 1008 has been received without error. In some embodiments, data packet 1000 is compliant with Institute of Electrical and Electronics Engineers (IEEE) 802.15.4 standard. Data packet 1000 when transmitted from a radio transceiver is transmitted as information encoded in binary form as chips. In various embodiments, chips have a one-to-one correspondence with data bits; data bits are encoded into chips using a chipping sequence; data bits are first encoded into symbols, and the symbols are mapped into a chip sequence; or any other appropriate mapping between chips and data bits.

In various embodiments, a timestamp corresponds to a time associated with a start of a start-of-frame delimiter, an end of a start-of-frame delimiter, a center of a start-of-frame delimiter, a start of a preamble, an end of a preamble, a center of a preamble, a start of a packet length field, an end of a packet length field, a center of a packet length field, a start of a checksum, an end of a checksum, a center of a checksum, a start of a payload byte, an end of a payload byte, a center of a payload byte, a start of a payload bit, an end of a payload bit, or a center of a payload bit, or any other appropriate received data bit, byte, chip, or any other appropriate portion of a packet.

In various embodiments, payload 1008 of an acknowledgement includes one or more of the following: one or more bits representing whether the receiver of the data packet is congested or not; an ACK or NACK in the Wireless HART standard; a more detailed encoding of the congestion state of the receiver (e.g., a CW value, a decrement value, a CW_MAX value, etc.); or any other appropriate acknowledgement data.

Figure 11:
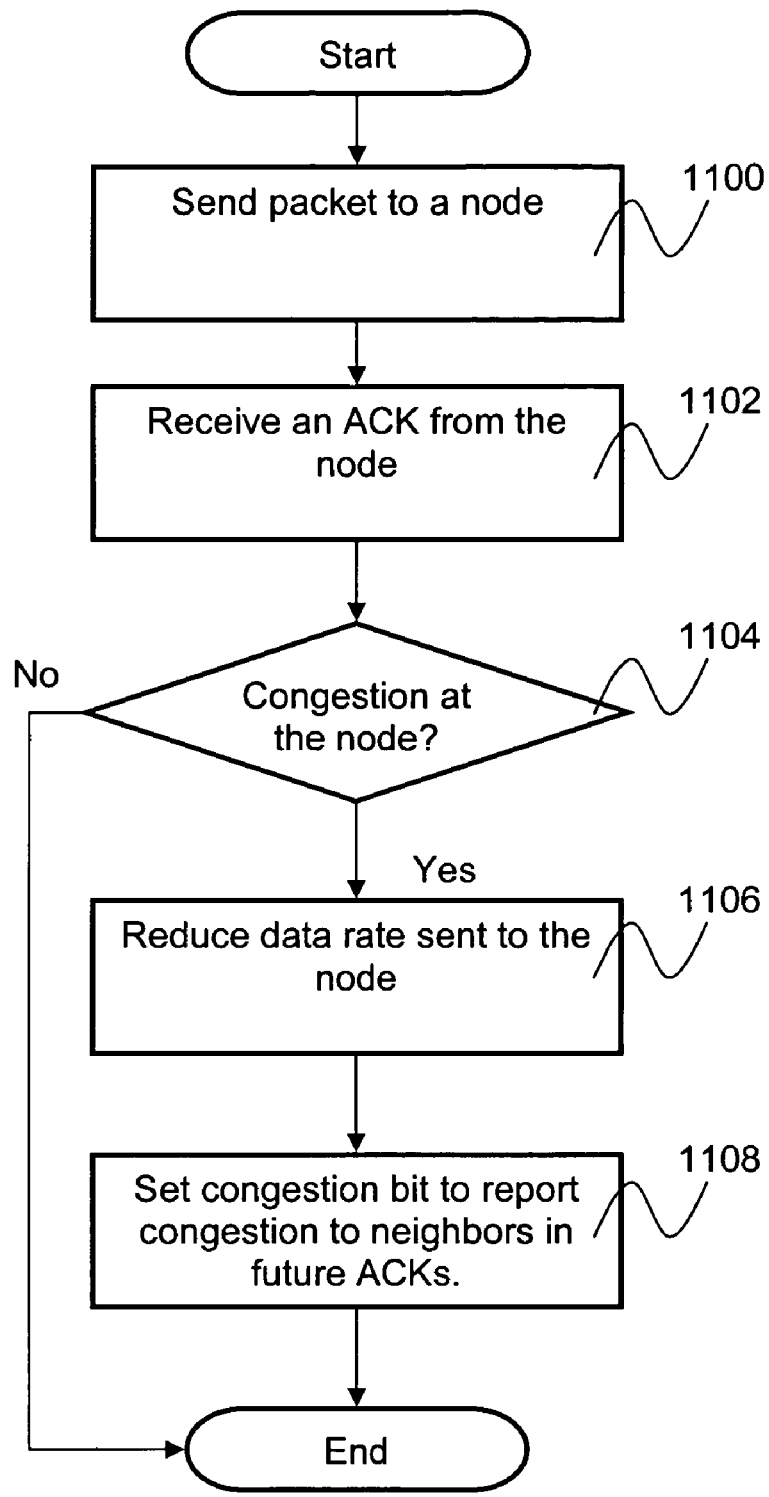
FIG. 11 is a flow diagram illustrating an embodiment of a process for reporting congestion to neighbors in a mesh network.

FIG. 11 is a flow diagram illustrating an embodiment of a process for reporting congestion to neighbors in a mesh network. In 1100, a packet is sent to a node. For example, a source node sends a data packet to a next node according to a graph according to a scheduled timeslot and channel that is mapped to a frequency (e.g., a one-to-one mapping or pseudorandom sequence mapping) as indicated in a superframe. In 1102, an acknowledgement is received from the node. In 1104, determine whether there is congestion at the node. For example, the received acknowledgement is used to determine if there is congestion (e.g., a message indication in the acknowledgement indicating a level of congestion at the node). If there is no congestion at the node, the process terminates. In the event that there is congestion at the node, in 1106 the data rate sent to the node is reduced. In 1108, congestion bit is set to report congestion to neighbors in future, and the process terminates. For example, on the next receipt of a packet from an upstream node, a source node indicates in the acknowledgement that there is a downstream congestion, which is used to reduce data rate sent from the upstream node.

In various embodiments, upon learning of congestion at its neighbor, a node completely halts generating data; a node reduces data generation according to some pre-defined formula; a node reports local congestion locally differently as compared to congestion learned from the neighbor or a neighbors' neighbor; a node adjusts its behavior differently based on local congestion, a neighbor's congestion, and a neighbor's neighbor's congestion; a node's data generation is temporarily reduced for a pre-defined time; a node's data generation is reduced until a new service is requested from a manager, or any other appropriate action in response to learning of congestion. Having any given node in the network contribute to the management of congestion at a particular point by reducing packet generation enables congestion management without a manager being involved. Different ranges and times of packet rate reduction are used to respond to congestion depending on whether a more or less aggressive response is desired and/or warranted.

In some embodiments, there is more than one overlapping transmission on the same frequency channel. This is sometimes due either to the assignment of the same timeslot and channel offset to different links in one network or the asynchronous interaction of transmissions between different networks. In some embodiments, the stability of the path in one or both of the transmissions that is reduced due to interference, which leads to increased risk of congestion, is mitigated by reducing the transmit power on paths with high stability.

Figure 12:
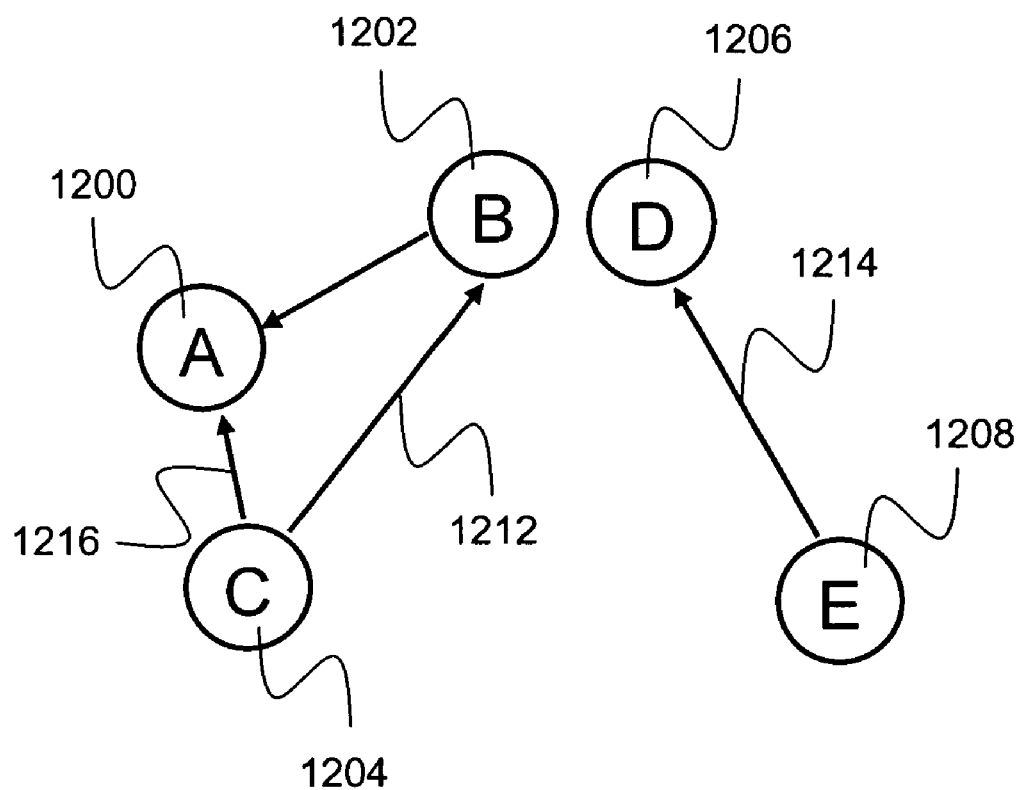
FIG. 12 is a block diagram illustrating an embodiment of sections of two mesh networks with nodes located in geographic proximity.

FIG. 12 is a block diagram illustrating an embodiment of sections of two mesh networks with nodes located in geographic proximity. In the example shown, node 1200, node 1202 and node 1204 are in one network while node 1206 and node 1208 are in another. Node 1202 and node 1206 are in close proximity such that signals destined for node 1202 interfere with those at node 1206 and vice versa. Transmissions on links on connection 1212 and connection 1216 both interfere with transmissions on links on connection 1214. However, transmissions on connection 1214 interfere with transmissions on connection 1212, but not transmissions on connection 1216. Suppose that high stability is reported on connection 1212 but not on connection 1216. Node 1204 is able to reduce transmit power for transmissions on connection 1212 resulting in less overall interference at node 1206. Transmissions on connection 1216 are unaltered, but overall there is less reduction in path stability on connection 1214 caused by node 1204.

Lower transmit power from a node does not improve congestion at the receiver of packets from the node, but rather for other nodes close to the node (e.g., nodes in the same network, nodes in a neighboring network, etc.). Consequently, if all networks reduce their transmit power as stability permits, the overall effect is one of decreased congestion across all networks and nodes.

Figure 13:
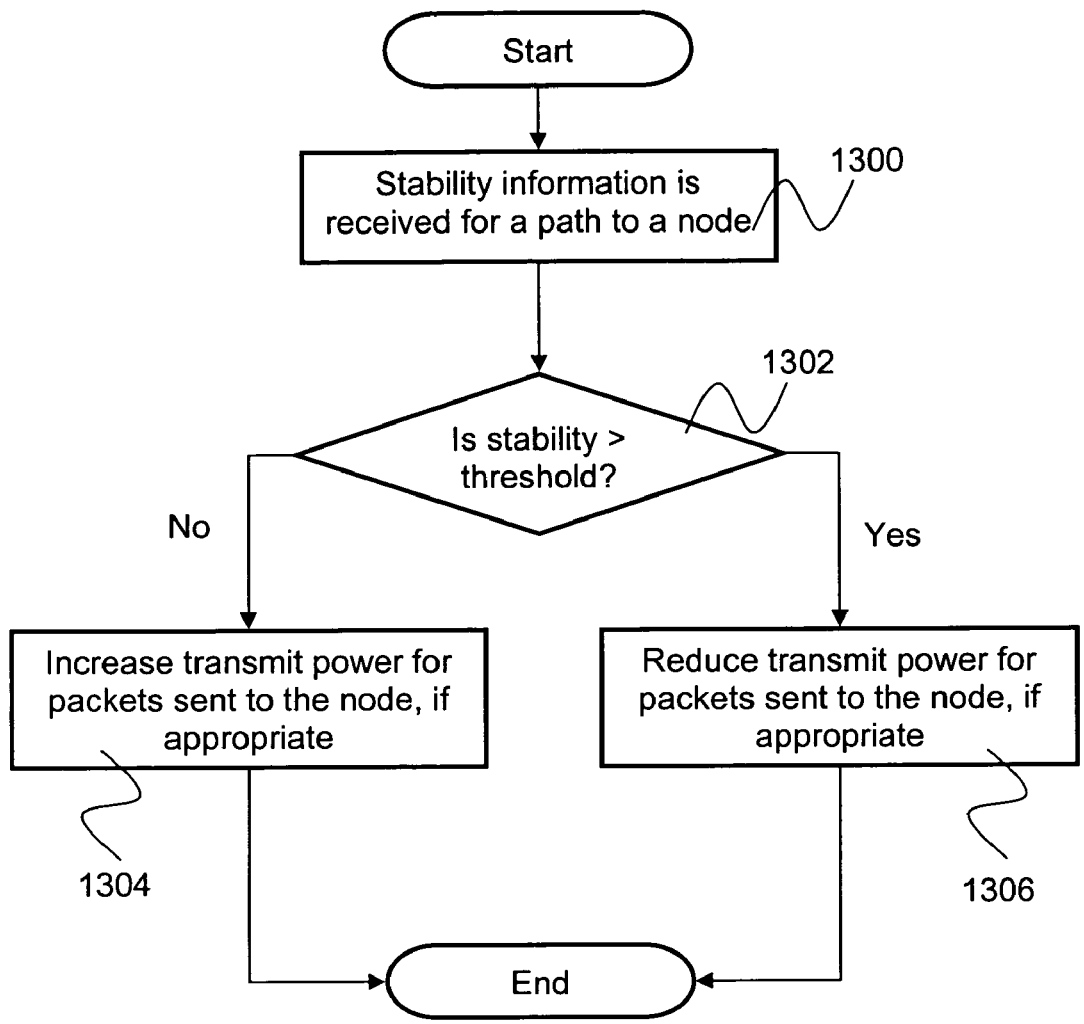
FIG. 13 is a flow diagram illustrating an embodiment of a process for reducing transmit power on high stability paths.

FIG. 13 is a flow diagram illustrating an embodiment of a process for reducing transmit power on high stability paths. In 1300, stability information is received for a path to a node. For example, the path stability information for a node is received using a percentage of acknowledged transmissions to the node. In 1302, it is determined whether the stability information is greater than a pre-defined threshold. For example, a percentage of acknowledged transmissions is considered acceptable if greater than a 95% percent success rate or greater in transmitting to the node. In the event that the stability information is above the predetermined threshold, in 1306 the transmit power is reduced for packets sent to the node, if appropriate, and the process terminates. For example, transmit power is reduced except when the path has specifically been flagged by a manager to not allow transmit power reduction. In the event that the stability information is not above the predetermined threshold, in 1304 transmit power is increased in packets sent to the node, if appropriate, the process terminates. For example, transmit power is increased when below the limit enforced by regulations and by local node energy savings restrictions.

In some embodiments, nodes have two transmit powers, high and low. In some embodiments, nodes have transmit power that can be changed to several discrete values or a continuously varying range of transmit power. In some embodiments, the node remembers previous adjustments in transmit power and bases decisions on this prior history.

In some embodiments, the packet contains the transmit power setting and the receiver replies with an acknowledgement sent at the same transmit power setting. In some embodiments, the receiver keeps an independent assessment of the transmit power requirement and adjusts the power of acknowledgements accordingly. In some embodiments, a received signal strength indicator (RSSI) is used to adjust the power of acknowledgements. In some embodiments, packets of high priority are not subject to reduced transmission powers regardless of local policy decisions.

Figure 14:
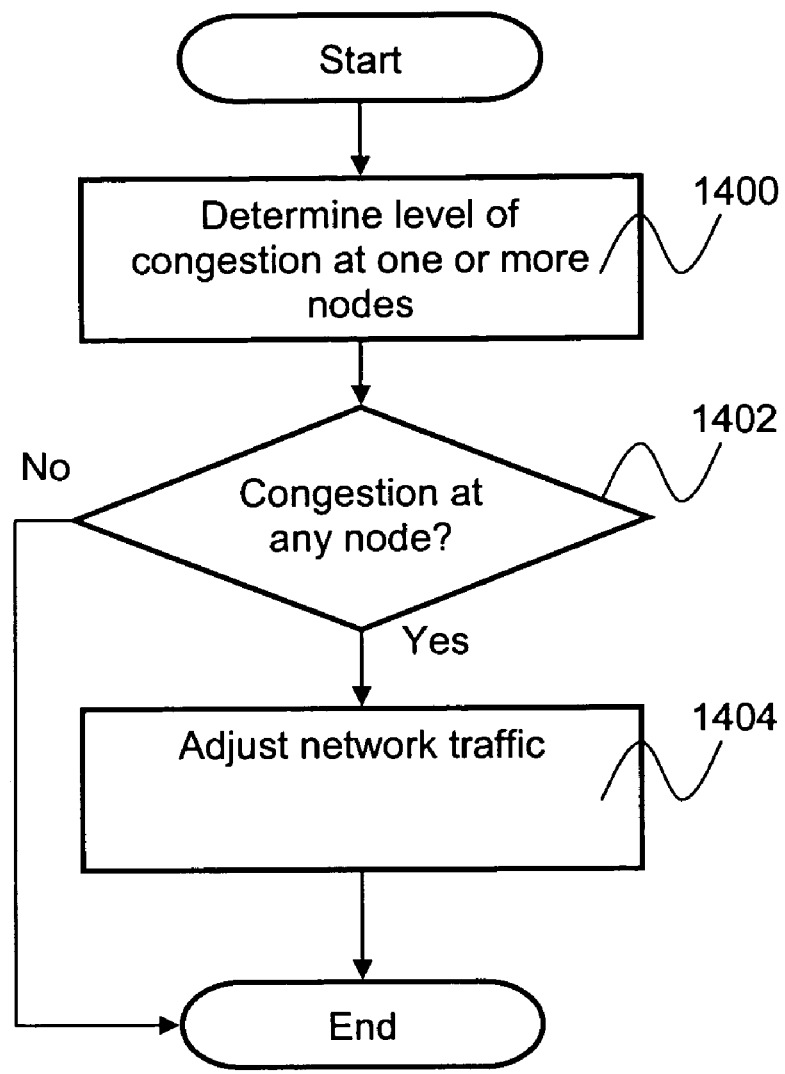
FIG. 14 is a flow diagram illustrating an embodiment of a process for congestion control.

FIG. 14 is a flow diagram illustrating an embodiment of a process for congestion control. In some embodiments, the process of FIG. 14 is executed using processor 208 of FIG. 2 or a processor of a manager. In the example shown, in 1400 the level of congestion at one or more nodes is determined. In various embodiments, this determination is made by keeping track of the congestion weight of nodes in a graph, by receiving a report of congestion directly from a neighbor in an acknowledgement packet from the neighbor, by receiving a report of congestion in a diagnostic packet, or by any other appropriate means. In 1402, the process checks if there is congestion at any node. If not, the process terminates. If so, in 1404 the network traffic is adjusted. In various embodiments, this adjustment is indicated by allocating additional resources, reducing the packet generation rate at one or more nodes, choosing the best packet to send from a list, reducing the transmission power at one or more nodes, or any other appropriate adjustment.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for congestion control for a wireless sensor network comprising:
a processor configured to:
determine a level of congestion at one or more nodes in a wireless sensor network, and
determine an adjustment to network traffic to reduce the level of congestion at the one or more nodes,
wherein the determination of the adjustment is based at least in part on path stability, wherein path stability is a metric of success of data transmission on a path, wherein a path is a link between two nodes,
wherein the adjustment to network traffic comprises allocating an additional resource, wherein the allocating of the additional resource comprises allocating of a number of additional links in a superframe, wherein the superframe comprises a communications schedule for the network, and wherein the superframe comprises a plurality of timeslots on one or more channels, wherein the schedule sets which timeslot and which channel data is sent, and wherein the allocated number of additional links in the superframe is determined based at least in part on an inverse of the path stability metric; and
a memory coupled to the processor, and configured to provide instructions to the processor.

2. The system as in claim 1, wherein the additional resource comprises one or more additional links in an existing superframe.

3. The system as in claim 2, wherein a number of additional links are determined using a scaling factor that is a function of the path stability metric.

4. The system as in claim 1, wherein the additional resource comprises one or more additional links in a new superframe.

5. The system as in claim 4, wherein a number of additional links are determined using a scaling factor that is a function of the path stability metric.

6. The system as in claim 1, wherein the adjustment to network traffic further comprises reducing a local packet generation rate of packets generated locally in one of the one or more nodes.

7. The system as in claim 6, wherein the packet generation rate is reduced temporarily.

8. The system as in claim 6, wherein the packet generation rate is reduced by halting a service running locally in the one node until a new service is requested in the one node.

9. The system as in claim 6, wherein the reduction of the packet generation rate is indicated by a manager.

10. The system as in claim 6, wherein the reduction of the packet generation rate is indicated by a node.

11. The system as in claim 1, wherein the adjustment further comprises selecting a best packet to send from a packet source.

12. The system as in claim 11, wherein the packet source comprises a manager.

13. The system as in claim 11, wherein the packet source comprises a node.

14. The system as in claim 11, wherein the best packet comprises a broadcast packet on a graph.

15. The system as in claim 11, wherein the best packet comprises a source routed packet.

16. The system as in claim 1, wherein determining the level of congestion comprises calculating a congestion risk at a manager.

17. The system as in claim 1, wherein the adjustment further comprises a reduction in transmit power on a particular path identified based on a path stability metric of the particular path.

18. The system as in claim 1, wherein determining the level of congestion uses a received report of congestion in a diagnostic packet.

19. The system of claim 1, wherein the allocation of an additional resource is performed by a network manager.

20. The system of claim 19, wherein determining the level of congestion uses path and node information reported to the network manager by neighboring nodes.

21. The system of claim 1, wherein the level of congestion is determined based at least on receiving a report of congestion included in the acknowledgement to receipt of a data packet.

22. The system of claim 1, wherein the level of congestion is determined based at least on a metric of path failure.

23. The system of claim 1, wherein the level of congestion is determined based at least in part on the node's queue length.

24. A method for congestion control for a wireless sensor network comprising:
determining, using a processor, a level of congestion at one or more nodes in a wireless sensor network, and
determining an adjustment to network traffic to reduce the level of congestion at the one or more nodes,
wherein the determination of the adjustment is based at least in part on a path stability, wherein the path stability is a metric of success of data transmission on a path, wherein a path is a link between two nodes,
wherein the adjustment to network traffic comprises allocating an additional resource, wherein the allocating of the additional resource comprises allocating of a number of additional links in a superframe,
wherein the superframe comprises a communications schedule for the network, and wherein the superframe comprises a plurality of timeslots on one or more channels, wherein the schedule sets which timeslot and which channel data is sent, and wherein the allocated number of additional links in the superframe is determined based at least in part on an inverse of the path stability metric.

25. The method as in claim 24, wherein the additional resource comprises one or more additional links in an existing superframe.

26. The method as in claim 25, wherein a number of additional links are determined using a scaling factor that is a function of the path stability metric.

27. The method as in claim 24, wherein the additional resource comprises one or more additional links in a new superframe.

28. The method as in claim 27, wherein a number of additional links are determined using a scaling factor that is a function of the path stability metric.

29. The method as in claim 24, wherein the adjustment to network traffic further comprises reducing a local packet generation rate of packets generated locally in one of the one or more nodes.

30. The method as in claim 29, wherein the packet generation rate is reduced temporarily.

31. The method as in claim 29, wherein the packet generation rate is reduced by halting a service running locally in the one node until a new service is requested in the one node.

32. The method as in claim 29, wherein the reduction of the packet generation rate is indicated by a manager.

33. The method as in claim 29, wherein the reduction of the packet generation rate is indicated by a node.

34. The method as in claim 24, wherein the adjustment further comprises selecting the best packet to send from a packet source.

35. The method as in claim 34, wherein the packet source comprises a manager.

36. The method as in claim 34, wherein the packet source comprises a node.

37. The method as in claim 34, wherein the best packet comprises a broadcast packet on a graph.

38. The method as in claim 34, wherein the best packet comprises a source routed packet.

39. The method as in claim 24, wherein determining the level of congestion comprises calculating a congestion risk at a manager.

40. The method as in claim 24, wherein the adjustment further comprises a reduction in transmit power on a particular path identified based on a path stability metric of the particular path.

41. The method as in claim 24, wherein determining the level of congestion uses a received report of congestion in a diagnostic packet.

42. A computer program product for congestion control for a wireless sensor network, the computer program product being embodied in a computer readable non-transitory storage medium and comprising computer instructions for executing on a processor for:
determining a level of congestion at one or more nodes in a wireless sensor network, and
determining an adjustment to network traffic to reduce the level of congestion at the one or more nodes,
wherein the determination of the adjustment is based at least in part on a path stability, wherein the path stability is a metric of success of data transmission on a path, where a path is a link between two nodes,
wherein the adjustment to network traffic comprises allocating an additional resource, wherein the allocating of the additional resource comprises a allocating a number of additional links in a superframe, wherein the superframe comprises a communications schedule for the network, and wherein the superframe comprises a plurality of sets of timeslots on one or more channels, wherein the schedule sets which timeslot and which channel data is sent, and wherein the allocated number of additional links in the superframe is determined based at least in part on an inverse of the path stability metric.

* * * * *